(12) United States Patent
Oh

(10) Patent No.: US 7,124,052 B2
Oh
(45) Date of Patent: Oct. 17, 2006

(54) MULTICHIP PACKAGE WITH CLOCK FREQUENCY ADJUSTMENT

(75) Inventor: Jong-Hoon Oh, Chapel Hill, NC (US)

(73) Assignee: Infineon Technologies AG, Munich (DE)

( * ) Notice: Subject to any disclaimer, the term of this patent is extended or adjusted under 35 U.S.C. 154(b) by 16 days.

(21) Appl. No.: 10/820,292

(22) Filed: Apr. 8, 2004

(65) Prior Publication Data

US 2005/0228612 A1    Oct. 13, 2005

(51) Int. Cl.
*G01K 1/08* (2006.01)
*G06F 15/00* (2006.01)

(52) U.S. Cl. ...................................... 702/132
(58) Field of Classification Search ................. 702/75, 702/99, 106, 107, 116, 117, 130, 132, 136; 327/512, 513
See application file for complete search history.

(56) References Cited

U.S. PATENT DOCUMENTS

| | | | |
|---|---|---|---|
| 6,121,682 A | 9/2000 | Kim | 257/723 |
| 6,507,514 B1 | 1/2003 | Tsao et al. | 365/185.17 |
| 6,518,655 B1 | 2/2003 | Morinaga et al. | 257/678 |
| 6,531,911 B1 * | 3/2003 | Hsu et al. | 327/512 |
| 6,643,136 B1 | 11/2003 | Hsu | 361/719 |
| 6,683,377 B1 | 1/2004 | Shim et al. | 257/723 |
| 6,690,089 B1 | 2/2004 | Uchida | 257/686 |
| 6,731,535 B1 * | 5/2004 | Ooishi et al. | 365/171 |
| 6,876,250 B1 * | 4/2005 | Hsu et al. | 327/539 |
| 2003/0056057 A1 * | 3/2003 | Lawrence | 711/106 |

FOREIGN PATENT DOCUMENTS

| | | | |
|---|---|---|---|
| DE | 101 63 306 | * | 4/2003 |
| DE | 102 41 928 | * | 3/2004 |

* cited by examiner

*Primary Examiner*—Michael Nghiem
(74) *Attorney, Agent, or Firm*—Dicks, Billig & Czaja, P.L.L.C.

(57) ABSTRACT

One embodiment of the present invention provides a multi-chip package including a logic device providing a clock signal having a frequency and a memory device. The memory device receives the clock signal and operates at the clock signal frequency. The memory device includes a temperature sensor providing a temperature signal indicative of a temperature of the memory device, wherein the logic device adjusts the clock signal frequency based on the temperature signal.

13 Claims, 5 Drawing Sheets

MULTICHIP PACKAGE WITH CLOCK FREQUENCY ADJUSTMENT

BACKGROUND

Multi-chip package (MCP) or multi-chip module (MCM) technology refers to the practice of mounting multiple, unpackaged integrated circuits (IC's) (sometimes referred to as "bare dies"), along with required support circuitry, on a single base material, such as ceramic. The multiple bare dies are "packaged" within an overall encapsulation material, the encapsulation material generally comprising some type of polymide or other polymer.

MCP's often comprise some type memory IC, such as a double-data rate synchronous dynamic random access memory (DDR SDRAM) stacked over some type of logic IC, such as a microprocessor. By combining the microprocessor with the memory IC in this fashion, the MCP provides a high density module that requires less space in an electrical system, such as on the motherboard of a computer, than if the microprocessor and memory IC were individually packaged and mounted. Additionally, by consolidating multiple circuit functions in a single MCP, the electrical system in which the MCP is installed requires fewer system assemblies, thereby reducing system costs and further reducing system size. The MCP also provides the benefit of integrated functional testing.

While combining a logic IC's with a memory IC to form an MCP can reduce system space requirements and the number of system assemblies, logic IC's are generally high power devices and generate a large amount of heat relative to memory IC's. The heat generated by the logic IC can heat the entire MCP and can negatively impact the performance of the memory IC, which is often designed with a lower maximum operating temperature than the logic IC. If the maximum operating temperature of the memory IC is exceeded, propagation delay within the memory IC may increase and the memory IC may not be able to operate at certain clock frequencies, potentially resulting in data errors and system failure.

SUMMARY

One embodiment of the present invention provides a multi-chip package including a logic device providing a clock signal having a frequency and a memory device. The memory device receives the clock signal and operates at the clock signal frequency. The memory device includes a temperature sensor providing a temperature signal indicative of a temperature of the memory device, wherein the logic device adjusts the clock signal frequency based on the temperature signal.

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
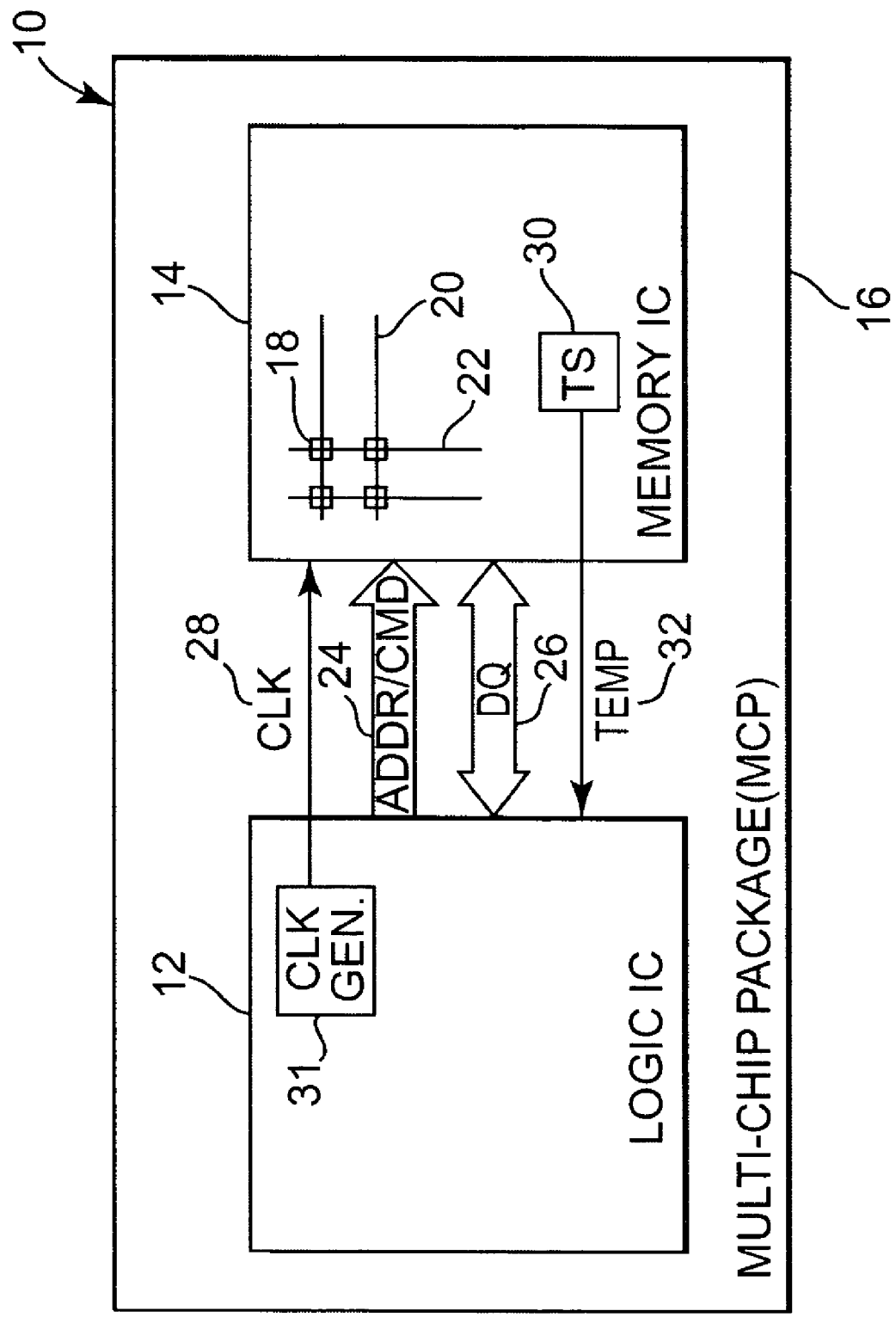
FIG. 1 is a block diagram illustrating generally a multi-chip package according to the present invention.

FIG. 1 is a block diagram illustrating generally one embodiment of a multi-chip package (MCP) 10 employing clock system according to the present invention. MCP 10 includes a logic IC 12 and a memory IC 14 within an overall encapsulation material 16. In one embodiment, logic IC 12 comprises a microprocessor (µP). In one embodiment, as illustrated, memory IC 14 is a random access memory device (RAM) and includes a plurality of memory cells 18 located at the intersections of conductive wordlines 20 and conductive bit lines 22. In one preferred embodiment, memory IC 14 is a double data rate synchronous dynamic random access memory device (DDR SDRAM).

Microprocessor 12 issues address and access signals to RAM 14 via a bus 24 to transfer data between selected memory cells 28 via a data bus 26. Microprocessor 12 includes a clock generator 31 that provides a clock signal (CLK) having a frequency to RAM 14 via a path 28.

RAM 14 operates at the clock signal frequency and includes a temperature sensor 30 that provides a temperature signal representative of a temperature of RAM 14 to microprocessor 12 via a path 28. In one embodiment, the temperature signal is representative of a junction temperature of RAM 14. In one embodiment, RAM 14 has a rated operating frequency at a rated operating temperature, wherein RAM 14 may not function reliably at the rated operating frequency if the temperature exceeds the rated operating temperature.

Microprocessor 12 adjusts the frequency of the clock signal provided via path 28 by clock generator 31 based on the temperature signal received from temperature sensor 30 via a path 32. In one embodiment, microprocessor 12 provides the clock signal at a frequency substantially equal to the rated operating frequency when the temperature signal indicates that the temperature of RAM 14 is less than the rated operating temperature, and provides the clock signal at a second frequency when temperature signal indicates that the temperature of RAM 14 is at least equal to the threshold temperature, wherein the second frequency is less than the first frequency and enables RAM to remain functional.

By adjusting the clock signal frequency based on the junction temperature of RAM 14, multi-chip package 10 employing a clock system according to the present invention remains operational even when the junction temperature of RAM 14 reaches or exceeds a rated operating temperature.

Figure 2:
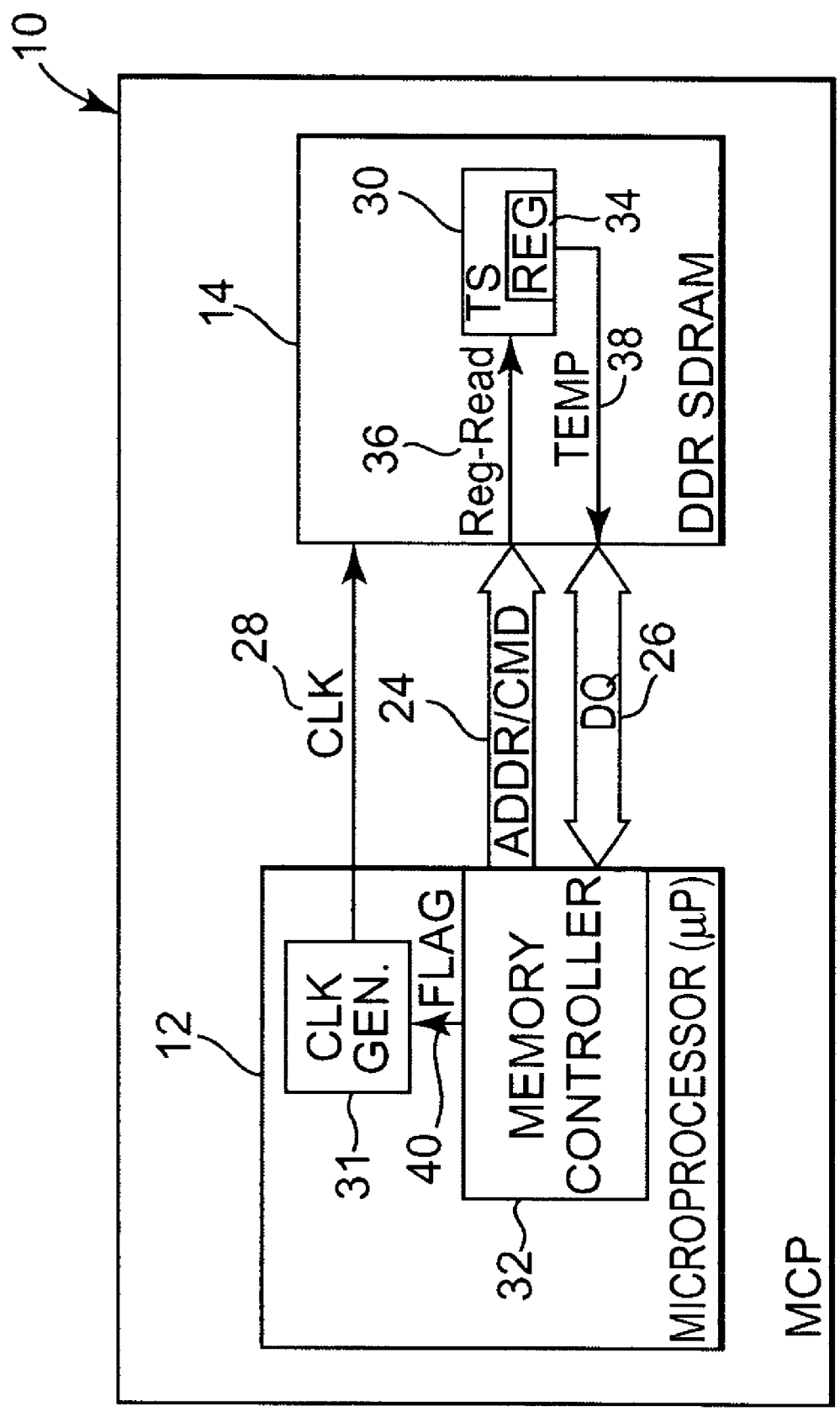
FIG. 2 is a block diagram illustrating one exemplary embodiment of a multichip package according to the present invention.

FIG. 2 is a block diagram illustrating one exemplary embodiment of multi-chip package 10 employing clock signal frequency adjustment according to the present invention. MCP 10 includes microprocessor 12 and DDR SDRAM 14, with microprocessor 12 further including a clock generator 32 and a memory controller 34, and DDR SDRAM 14 further including temperature sensor 30. Clock generator 31 provides a clock signal (CLK) having a frequency to DDR SDRAM 14 via path 28. DDR SDRAM 14 operates at the clock signal frequency receive via path 28, and is designed to operate at clock signal frequencies up to a maximum rated clock signal frequency at a rated operating temperature, wherein reliable operation of DDR SDRAM 14 at the maximum rated clock signal frequency is not guaranteed at temperatures exceeding the rated operating temperature.

Memory controller 32 controls reading data from and writing data to DDR SDRAM 14. Memory controller 32 issues address signals of selected memory cells 18 within DDR SDRAM 14 and access command via address/command (ADDR/CMD) bus 24. In response to the address signals and access commands, DDR SDRAM 14 either receives data from or places data on data bus 26.

Temperature sensor 30 monitors the internal temperature, or junction temperature, of DDR SDRAM 14. Temperature sensor 30 measures the junction temperature of DDR DRAM 14 and stores temperature flag data representative of the measured junction temperature in a register 34. In one embodiment, the temperature flag data is indicative of whether the measured junction temperature is above or at/below the rated operating temperature of DDR SDRAM 14. In one embodiment, temperature sensor 30 comprises a junction diode type sensor, as is well-known in the art.

Memory controller 32 periodically issues a register read command (Reg_read) to temperature sensor 30 via ADDR/CMD bus 24 and a path 36. In response to the Reg_read command, temperature sensor 30 provides the temperature flag data representative of the present junction temperature of DDR SDRAM 14 from data register 34 to memory controller 32 via a path 38 and data bus 26. Memory controller 34 provides to clock generator 31 a flag signal at 40 having a first state when the temperature flag data indicates the present junction temperature is at or below the rated operating temperature, and having a second state when the temperature flag data indicates the present junction temperature exceeds the rated operating temperature. In one embodiment, the first state of the flag signal at 40 comprises a low state (LO) and the second state comprises a high state (HI).

In one embodiment, when the flag signal at 40 is at the LO state, clock generator 31 provides the clock signal at 28 at a frequency substantially equal to the maximum rated clock signal frequency. When the flag signal at 40 is at the HI state, clock generator 31 provides the clock signal at 28 at a frequency below the maximum rated clock signal frequency such that reliable operation of DDR SDRAM 14 is guaranteed even though temperature of DDR SDRAM 14 exceeds the rated operating temperature. Similarly, if the present junction temperature of DDR SDRAM 14 subsequently falls below the rated operating temperature, clock generator 31 will once again provide the clock signal at 28 at the maximum rate clock signal frequency.

Figure 3:
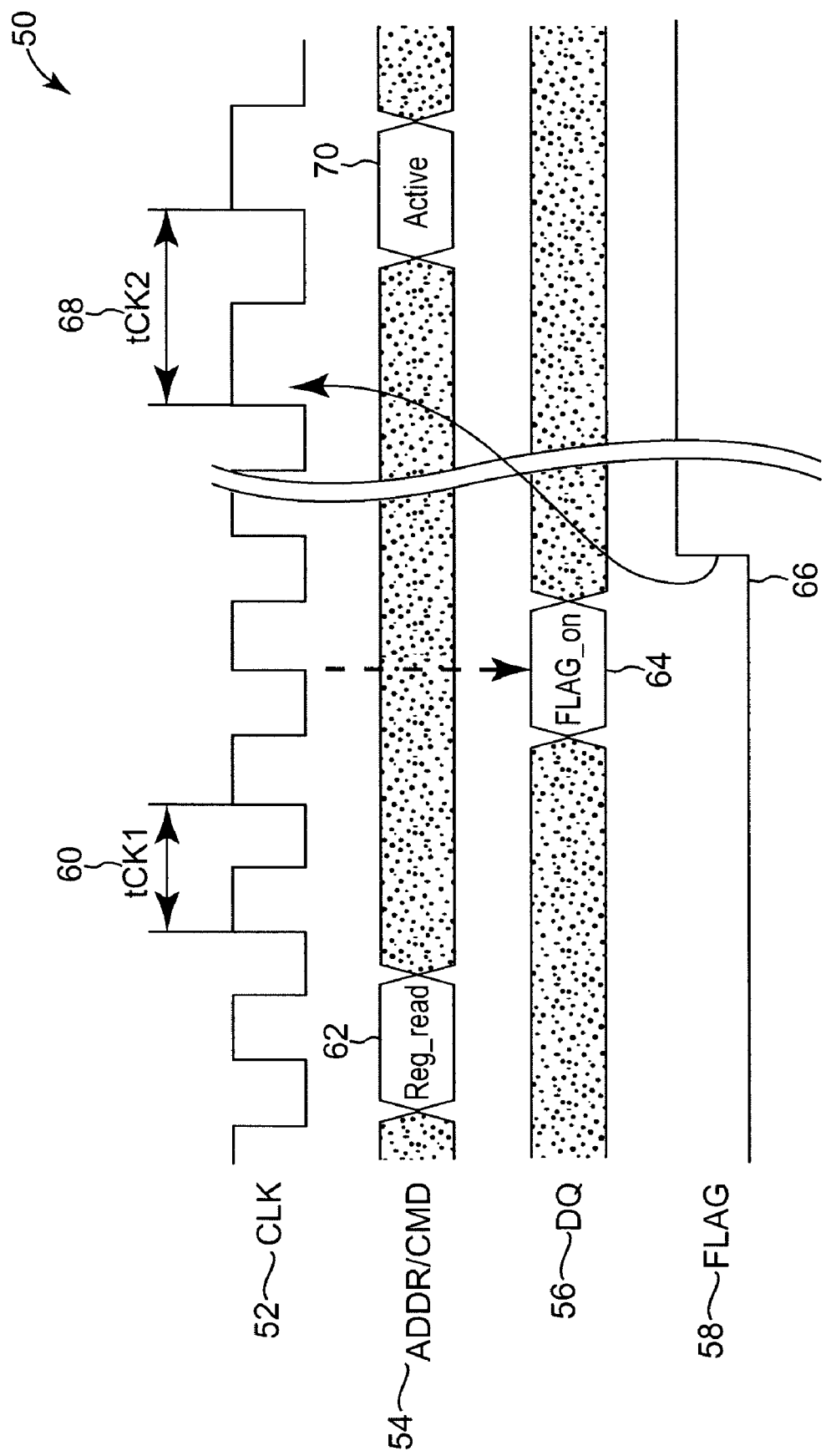
FIG. 3 is a timing diagram illustrating an example operation of the command block of FIG. 2.

FIG. 3 is a timing diagram 50 illustrating an exemplary operation of multi-chip package 10 as illustrated above by FIG. 2 in response to the temperature of DDR SDRAM 14 exceeding the rated operating temperature. The clock signal provided at 28 by clock generator 31 is illustrated by waveform 52, the address signals and commands issued by memory controller 32 are illustrated at 54, data transferred via data bus 26 is illustrated at 56, and the flag signal provided by memory controller 32 at 40 is illustrated by the waveform at 58.

As illustrated, clock generator 31 initially provides a clock signal at a frequency substantially equal to the maximum rated clock frequency of DDR SDRAM 14, as indicated by clock period tCK1 at 60. Memory controller issues a register read command (Reg_read) as indicated at 62. In response to Reg_read command 62, temperature sensor 30 provides the temperature flag data to memory controller 32 via path 38 and data bus 26, as indicated at 64. As described above, the present operating temperature of DDR SDRAM 14 exceeds the rated operating temperature. Thus, the temperature flag data is represented by the term "FLAG_on" at 64.

In response to the temperature flag data (FLAG_on) indicating that present operating temperature of DDR SDRAM exceeds the rated operating temperature, memory controller 32 sets the flag signal at 40 from a LO state to a HI state, as indicated at 66. In response to the flag signal at 40 being at a HI state, clock generator 31 decreases the frequency of the clock signal at 28, as indicated by clock period tCK2 at 68. The clock period tCK2 168 is such that DDR SDRAM 14 is guaranteed to provide reliable operation even though the junction temperature exceeds the rated operating temperature. During a transition of the clock signal from a clock period of tCK1 to a clock period of tCK2, memory controller 32 is inhibited from issuing new commands until the clock signal is settled at tCK2 68 and new active commands can be issued, as indicated at 70.

Figure 4:
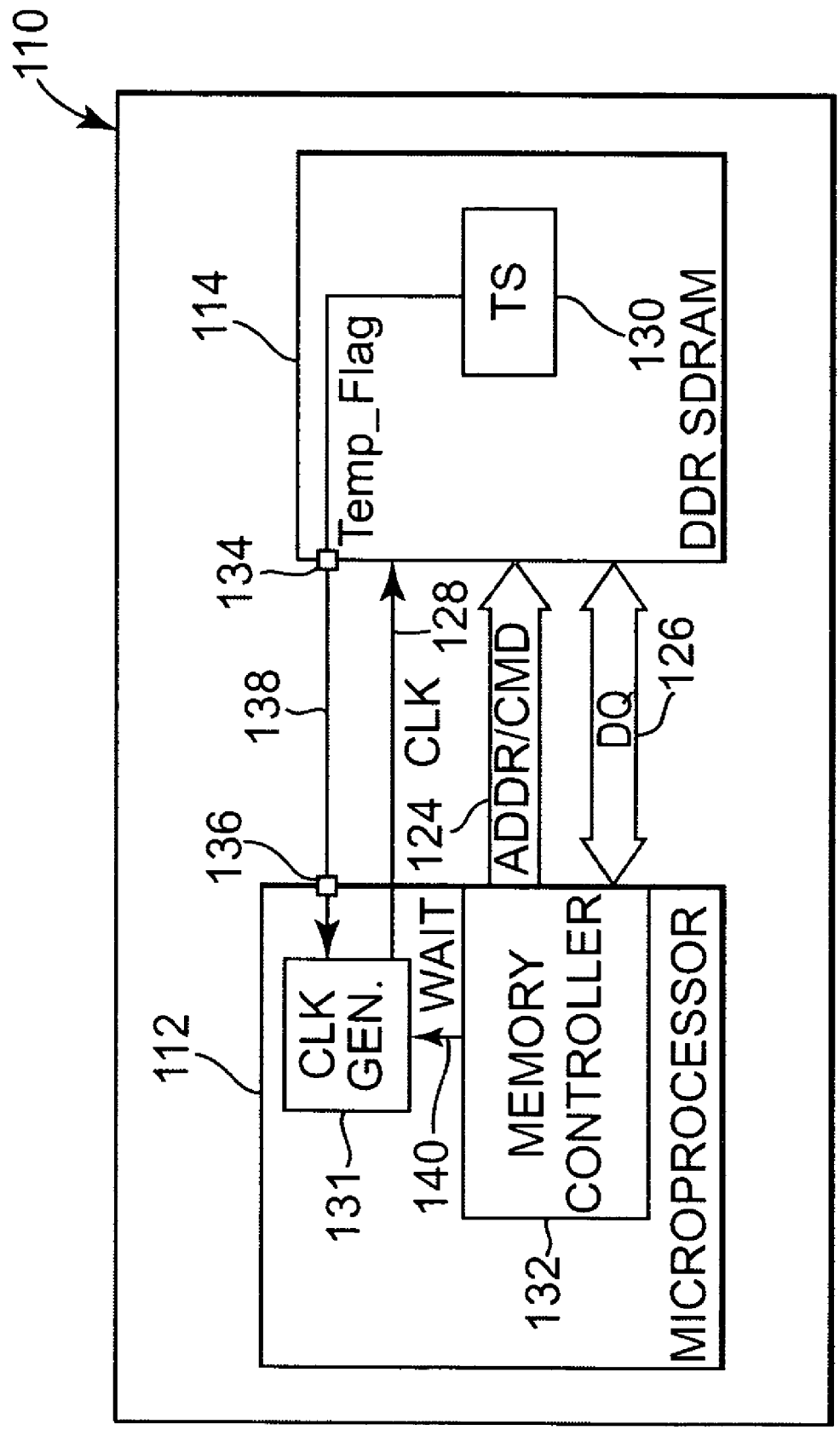
FIG. 4 is a block diagram illustrating one exemplary embodiment of a multichip package according to the present invention.

FIG. 4 is a block diagram illustrating another exemplary embodiment of multi-chip package 110 with clock signal frequency adjustment according to the present invention. MCP 110 includes a microprocessor 112 and a DDR SDRAM 114, with microprocessor 112 further including a clock generator 132 and a memory controller 134, and DDR SDRAM 114 further including temperature sensor 130. Clock generator 131 provides a clock signal (CLK) having a frequency to DDR SDRAM 114 via path 128. DDR SDRAM 114 operates at the clock signal frequency receive via path 128, and is designed to operate at clock signal frequencies up to a maximum rated clock signal frequency at a rated operating temperature, wherein reliable operation of DDR SDRAM 114 at the maximum rated clock signal frequency is not guaranteed at temperatures exceeding the rated operating temperature.

Memory controller 132 controls reading data from and writing data to DDR SDRAM 114. Memory controller 132 issues address signals of selected memory cells 118 within DDR SDRAM 114 and access command via address/command (ADDR/CMD) bus 124. In response to the address signals and access commands, DDR SDRAM 114 either receives data from or places data on data bus 126.

Temperature sensor 130 measures the internal temperature, or junction temperature, of DDR SDRAM 114 and provides a temperature flag signal (Temp_Flag) representative of the junction temperature at a pad 134. In one embodiment, the Temp_Flag signal indicates whether the measured junction temperature is above or at/below the rated operating temperature of DDR SDRAM 114. In one embodiment, the Temp_Flag signal at pad 134 has a first state when the internal temperature is at or below the rated operating temperature, and a second state when the internal temperature exceeds the rated operating temperature. In one embodiment, the first state of the Temp_Flag signal at output 140 comprises a low state (LO) and the second state comprises a high state (HI).

Microprocessor 112 includes a pad 136 coupled to pad 134 of DDR SDRAM 114 via a path 138. Clock generator 131 is coupled to and receives the Temp_Flag signal via pad 136. In one embodiment, when the Temp_Flag signal at pad 136 is at the LO state, clock generator 131 provides the clock signal at 128 at a frequency substantially equal to the maximum rated clock signal frequency of DDR SDRAM 114. When the Temp_Flag signal at pad 136 is at the HI state, clock generator 131 provides the clock signal at 128 at a frequency below the maximum rated clock signal frequency such that reliable operation of DDR SDRAM 114 is guaranteed even though temperature of DDR SDRAM 114 exceeds the rated operating temperature.

Similarly, if the present junction temperature of DDR SDRAM 114 subsequently falls below the rated operating temperature, the Temp_Flag signal will transition from a HI to a LO state, and clock generator 131 will once again provide the clock signal at 128 at the maximum rate clock signal frequency of DDR SDRAM 114. In either case, if a transition in state of the Temp_Flag signal occurs while an access operation of DDR SDRAM 114 by microprocessor 112 is on-going, clock generator 131 will delay a change in the frequency of the clock signal at 128 until the access operation is complete as indicated by a WAIT signal at 140.

Figure 5:
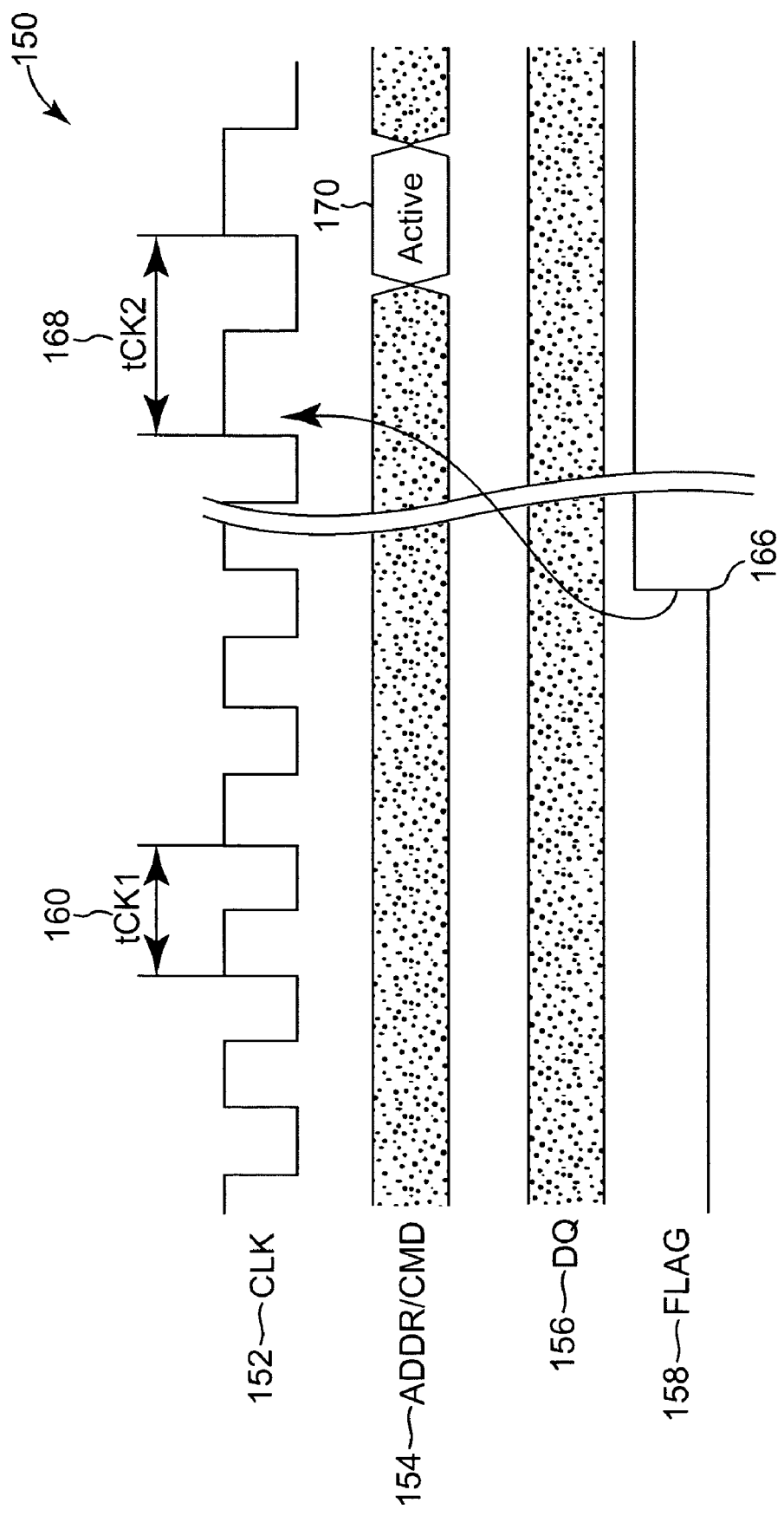
FIG. 5 is a timing diagram illustrating an example operation of the command block of FIG. 4.

FIG. 5 is a timing diagram 150 illustrating an exemplary operation of multi-chip package 110 as illustrated above by FIG. 4 in response to the temperature of DDR SDRAM 114 exceeding the rated operating temperature. The clock signal provided at 128 by clock generator 131 is illustrated by waveform 152, the address signals and commands issued by memory controller 132 are illustrated at 154, data transferred via data bus 126 is illustrated at 156, and the Temp_Flag signal provided at pad 136 by temperature sensor 103 is illustrated by the waveform at 158.

As illustrated, clock generator 131 initially provides a clock signal at a frequency substantially equal to the maximum rated clock frequency of DDR SDRAM 114, as indicated by clock period tCK1 at 160. As illustrated at 166, the Temp_Flag signal at pad 136 transitions for a LO state to a HI state, indicating that the present operating temperature of DDR SDRAM 114 has exceeded the rated operating temperature. In response to the Temp_Flag signal at pad 136 being set to the HI state by temperature sensor 130, clock generator 131 decreases the frequency of the clock signal at 128, as indicated by clock period tCK2 at 168. The clock period tCK2 is such that DDR SDRAM 114 is guaranteed to provide reliable operation even though the junction temperature exceeds the rated operating temperature. During a transition of the clock signal from a clock period of tCK1 to a clock period of tCK2, memory controller 132 is inhibited from issuing new commands until the clock signal is settled at tCK2 168 and new active commands can be issued, as indicated at 170.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A multi-chip package comprising:
a memory device receiving a clock signal having a frequency, the memory device operating at the clock signal frequency and including a temperature sensor providing a temperature signal representative of a temperature of the memory device, wherein the memory device has a rated operating frequency at a rated operating temperature; and a logic device providing the clock signal and receiving the temperature signal, wherein the logic device adjusts the clock signal frequency based on the temperature signal, and wherein the logic device provides the clock signal at a first frequency when the temperature signal indicates that the temperature of the memory device is less than a threshold temperature, and provides the clock signal at a second frequency when temperature signal indicates that the temperature of the memory device is at least equal to the threshold temperature, wherein the threshold temperature is substantially equal to rated operating temperature, wherein the first frequency is substantially equal to the rated operating frequency, and wherein the second frequency is less than the first frequency and at a frequency at which the memory device operates reliably at a temperature above the rated operating temperature.

2. The multi-chip package of claim 1, wherein the memory device comprises a random access memory device.

3. The multi-chip package of claim 1, wherein the memory device comprises a magnetic random access memory device.

4. The multi-chip package of claim 1, wherein the logic device comprises a microprocessor.

5. The multi-chip package of claim 1, wherein the temperature signal is indicative of a junction temperature of the memory device.

6. The multi-chip package of claim 1, wherein the logic device further includes a clock generator configured to generate the clock signal.

7. The multi-chip package of claim 6, wherein the temperature sensor provides the temperature signal having a first state when the temperature of the memory device is less than rated operating temperature and having a second state when the temperature of the memory device is at least equal to the threshold temperature, and wherein the wherein the clock generator provides the clock signal at the rated operating frequency when the temperature signal has the first state and at the second frequency when the temperature signal has the second state.

8. The multi-chip package of claim 6, wherein the logic device further includes a memory controller configured to control access operations of the memory device by the logic device, wherein the temperature sensor provides the temperature signal in response to a read signal, wherein the memory controller provides the read signal and provides a flag signal having a first state when the temperature signal indicates that the memory device temperature is less than the rated operating temperature and a second state when the temperature signal indicates that the memory device temperature is at least equal to the rated operating temperature, and wherein the wherein the clock generator provides the clock signal at the rated operating frequency when the flag signal has the first state and at the second frequency when the flag signal has the second state, and wherein the memory controller provides a wait signal representative of whether an access operation is on-going, and wherein a timing of an adjustment of the clock signal frequency by the clock generator is based on the wait signal.

9. A clock system in a multichip package including a memory device, the clock system comprising:

a clock generator providing a clock signal having a frequency to the memory device, wherein the memory device has a rated operating frequency at a rated operating temperature; and a temperature sensor providing a temperature signal representative of a temperature of the memory device, wherein the clock generator adjusts the frequency of the clock signal based on the temperature signal, and wherein the clock generator provides the clock signal at a first frequency when the temperature signal indicates that the temperature of the memory device is less than a threshold temperature and at a second frequency when the temperature signal indicates that the temperature of the memory device is at least equal to the threshold temperature;

wherein the threshold temperature is substantially equal to the rated operating temperature, wherein the first frequency is substantially equal to the rated operating frequency, and wherein the second frequency is less than the first frequency and at a frequency at which the memory device operates reliably at a temperature above the rated operating temperature.

10. The clock system of claim 9, wherein multichip package includes a logic device.

11. The clock system of claim 10, wherein the logic device comprises a microprocessor.

12. The clock system of claim 9, wherein the memory device comprises a random access memory device.

13. The clock system of claim 9, wherein the memory device comprises a magnetic random access memory device.

* * * * *